United States Patent

Martin

[11] 3,963,306
[45] June 15, 1976

[54] MULTIPLE OBJECTIVE SUPPORTING AND POSITIONING ASSEMBLY FOR A MICROSCOPE

[75] Inventor: Guy E. Martin, Brighton, N.Y.
[73] Assignee: Bausch & Lomb Incorporated, Rochester, N.Y.
[22] Filed: Jan. 22, 1975
[21] Appl. No.: 542,889

Related U.S. Application Data

[63] Continuation of Ser. No. 375,579, July 2, 1973, abandoned.

[52] U.S. Cl. .................................. 350/39; 350/46; 350/254; 350/255
[51] Int. Cl.² ............................................. G02B 7/16
[58] Field of Search ............... 350/39, 46, 47, 254, 350/255

[56] References Cited
UNITED STATES PATENTS

| | | | |
|---|---|---|---|
| 1,494,801 | 5/1924 | Pittman | 350/254 X |
| 2,005,014 | 6/1935 | Tondreau | 350/39 X |
| 2,065,993 | 12/1936 | Billing | 350/254 X |

FOREIGN PATENTS OR APPLICATIONS

| | | | |
|---|---|---|---|
| 949,539 | 2/1949 | France | 350/39 |
| 761,063 | 11/1956 | United Kingdom | 350/39 |

Primary Examiner—David H. Rubin
Attorney, Agent, or Firm—Frank C. Parker; DeWitt M. Morgan

[57] ABSTRACT

A cam actuated assembly for a microscope. The assembly includes a hollow tubular support member and a nosepiece or multiple objective carrier. The tubular member is provided with a cam surface and is symmetrical with respect to an axis which, in the assembled microscope, is off set from and parallel to the optical axis of the microscope. The carrier, which is also symmetrical with respect to an axis, is partially received within the tubular member and includes a cam follower which cooperates with the cam surface. The carrier also includes at least two openings or cavities each of which is adopted to receive a microscope objective. The axes of these openings are parallel to one another and off set from the axis of the carrier by an amount equal to the off set between the axis of the tubular member and the optical axis. Rotation of the carrier relative to the tubular member permits successive alignment of the axes of the objective receiving openings with the optical axis and simultaneous movement of the carrier in a direction parallel to the optical axis. Apparatus is also provided to permit limited retraction of the nosepiece or carrier into the tubular member.

12 Claims, 4 Drawing Figures

MULTIPLE OBJECTIVE SUPPORTING AND POSITIONING ASSEMBLY FOR A MICROSCOPE

This is a continuation, of application Ser. No. 375,579, filed July 2, 1973, now abandoned.

BACKGROUND OF THE INVENTION

Several mechanisms are known to provide for varying the power of a microscope. U.S. Pat. No. 2,103,525 discloses a binocular or stereo microscope with a multiple objective carrier which is movable along an arcuate track via a rack and pinion mechanism. U.S. Pat. No. 2,133,509 discloses a similar stereo microscope including an objective carrier and an inclined track. By moving the objective carrier vertically as well as laterally different objectives may be brought into alignment with the optical axis. The purpose of such an arrangement is to eliminate interference between the longer objectives and large specimens. However, the arrangement is such that the lower end of the track is always potentially in the way. Revolving nosepieces such as disclosed in U.S. Pat. Nos. 1,971,061 and 3,565,512 are well known and probably the most common method of providing for a selection of various magnifying powers. Attention is also directed to U.S. Pat. No. 2,237,943 which discloses a plurality of intermediate optical systems secured in a rotatable housing.

SUMMARY OF THE INVENTION

A multiple objective supporting and positioning assembly for a microscope including a support member having an axis and a carrier that has at least two openings each of which is adapted to receive an objective. Apparatus, in the form of a continuous, unending cam surface and a cam follower, provided for permitting rotational movement of the carrier relative to the support member and simultaneous movements of the carrier relative to the support member in a direction parallel to the axis of the support member. Each of the objective receiving openings has an axis which are, at least, substantially parallel to each other. These axes are also, at least, substantially parallel to the axis of the support member and equally spaced therefrom. Apparatus is also provided for yieldably holding the cam follower in engagement with the cam surface and for limiting relative axial movement between the support member and the carrier.

DETAILED DESCRPTION OF THE PREFERRED EMBODIMENT

Figure 1:
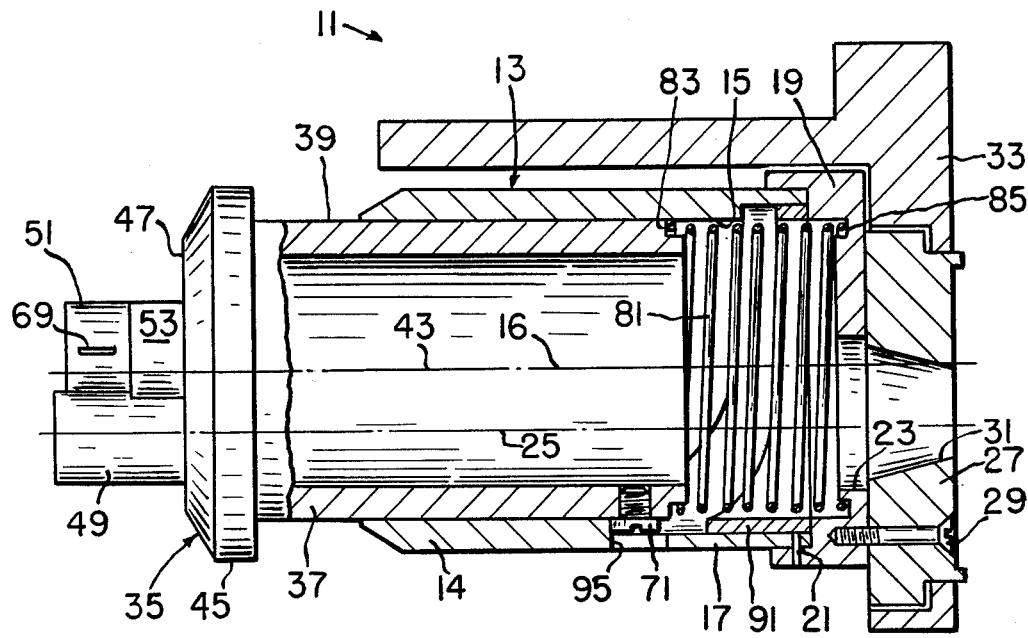
FIG. 1 is a partial sectional view of the preferred embodiment of the invention.

Objective supporting and positioning assembly 11 is shown in partial sectional view in FIG. 1. Support 13 includes a hollow tubular member 14 which has an internal surface 15 that is symmetrical about axis 16. End 17 of tubular member 14 is secured to stop member 19 by a plurality of locking pins such as illustrated at 21. Alternately, member 14 and stop member 19 may be cemented together. Stop member 19 is symmetrical about an axis which, when stop member 19 is assembled to member 14, is substantially coincident with axis 16. Stop member 19 is also provided with an opening 23 which is symmetrical with respect to an axis that, in the assembled microscope, substantially coincides with microscope optical axis 25. As is also evident from FIG. 1, stop member 19 is, in turn, secured to adapter 27 by, for instance, flat headed screws such as illustrated at 29. Adapter 27 is provided with an opening 31 which, again in the assembled microscope, is substantially symmetrical about optical axis 25. To those skilled in the art it should be evident that adapter 27 and stop 19 may be fabricated as one part. Adapter 27 is secured (by means not shown) to arm mount 33 which, in turn, is adapted to be attached to a microscope base or stand (also not shown).

Nosepiece or multiple objective carrier 35 includes a hollow tubular portion 37 having an exterior surface 39 that is symmetrical with respect to carrier axis 43. The outside diameter of tubular portion 37 is just slightly less than the inside diameter of tubular member 14 so as to provide a close fit between tubular portion 37 and tubular member 14. This arrangement aligns carrier axis 43 with axis 16 and enables surfaces 15 and 39 to cooperate with each other to guide carrier 35 as it both rotates relative to support 13 about coincident axes 16 and 43 and moves relative to support 13 in a direction parallel to coincident axes 16 and 43. Rotation is facilitated by knurled grip 45.

Figure 2:
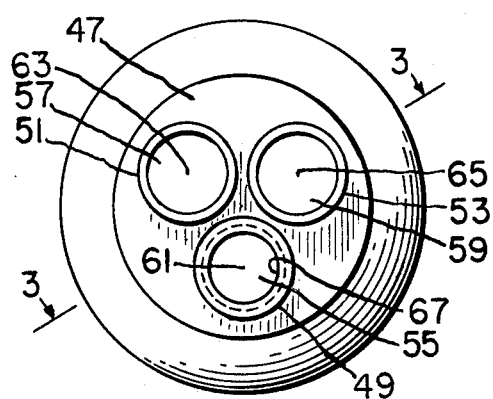
FIG. 2 is an end view of the multiple objective carrier.
Figure 3:
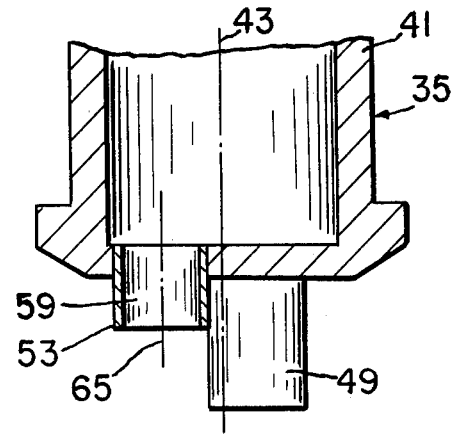
FIG. 3 is a sectional view of the end of the multiple objective carrier taken along line 3—3 of FIG. 2.

Secured in openings in end 47 of multiple objective carrier 35 are a series of tube like members 49, 51 and 53 which include cavities 55, 57 and 59 for receiving a series of objectives of various powers. In the illustrated embodiment these tubes are suitably secured to end 47 by screw threads or cement (not shown). Alternately, objective cavities 55, 57 and 59 may be formed with tubular portion 37 as a single piece. Regardless of this construction detail objective cavities 55, 57 and 59 are symmetrical with respect to axes 61, 63 and 65 as illustrated in FIG. 2. As is also evident from the drawings these axes are parallel to each other and to carrier axis 43. They are also spaced from carrier axis 43 by an amount equal to the off set between support axis 16 and optical axis 25. With such an arrangement the optical axis of each of the objectives may be successively aligned with optical axis 25 as carrier 35 is rotated relative to support 13.

In the preferred embodiment each of the objective cavities 55, 57 and 59 receives a pre-assembled objective lens cell (not shown). With such an arrangement the cell of the highest power is received within member 49 until it bottoms against internal lip 67. The position of the cell received within each of the members 51 and 53 is adjustable by insertion of an appropriate tool in slots such as illustrated at 69 in FIG. 1.

Hollow tubular portion 39 also includes a cam follower 71 in the form of a screw which rides on cam surface 73 provided in tubular member 14. As is evident from inspection of FIG. 4 surface 73 includes a plurality of detents 75, 77 and 79 which are adapted to receive cam follower 71 to hold nosepiece 35 in those positions in which axes 61, 63 or 65 are in alignment with optical axis 25. As is also evident from FIG. 1 and FIG. 4 cam surface 73 is configured so that when objective cavity 55, which is designed to receive the highest power objective, is in line with the optical axis 25, the carrier 35, relative to the microscope stage (not shown), is at its lowest position. Rotation to lower power objectives housed, respectively, in cavities 57 and 59 move carrier 35 in a direction parallel to coincident axes 16 and 43 to permit greater clearance between carrier 35 and the microscope stage.

Figure 4:
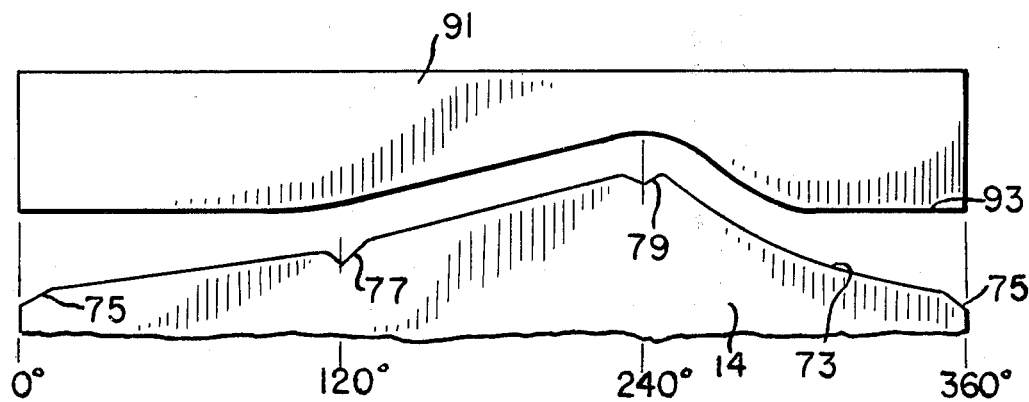
FIG. 4 is a flattened view of the cam surface according to the principles of this invention.

Spring 81 secured between lip 83 provided on carrier 35 and recess 85 in stop member 19 biases cam follower 71 into continuous engagement with cam surface 73. Spring 81 also permits inward travel of tubular portion 37 relative to member 14. Such an arrangement prevents damage to a slide supported on the microscope stage by impact from member 49 when multiple objective carrier 35 is rotated to its lower most position and there is insufficient clearance between member 49 and the microscope stage. However, in order to prevent excessive free travel (against the bias of spring 81) an anti-shock spacer 91 is provided. As is illustrated in FIG. 4, this spacer includes a stop surface 93. As is also evident from FIG. 1 and FIG. 4 when spacer 91 is received within member 14 the clearance between surface 93 and cam surface 73 is greatest when the objective supported in tubular member 49 is aligned with optical axis 25. This arrangement provides for sufficient retraction of carrier 35 to prevent breakage of a slide while making it impossible for the microscope user to damage the microscope via shock through mishandling by withdrawing tubular portion 37 within member 14 as far as possible to compress spring 81 and then suddenly releasing carrier 35.

Cam follower 71 takes the form of a screw to permit convenient assembly of carrier 35 to support 13. With tubular portion 37 properly positioned within member 14 follower 71 may be inserted through opening 95 and screwed into place. With these two elements thus assembled and lens cells of the appropriate powers received within objective cavities 55, 57 and 59 parfocality between the two lower powered cells relative to the highest powered cell is achieved by moving the lower powered cells in their respective tubular members (51 and 53) with an adjusting instrument inserted in slot 69. When parfocality is achieved the lower powered cells are secured in place by any convenient means, such as a drop of cement in the adjusting slot 69.

Whereas the drawings and accompanying description have shown and described the preferred embodiment of the present invention it should be apparent to those skilled in the art that numerous changes may be made in the form of the invention without affecting the scope thereof.

What I claim is:

1. A multiple objective supporting and positioning assembly for a microscope, said assembly comprising:
   a. a support means having an axis;
   b. carrier means including a plurality of objective mounting means; and
   c. means provided on both said support means and said carrier means for permitting rotational movement of said carrier means relative to and without movement of said support means about said support means axis and simultaneous movement of said carrier means relative to and without movement of said support means in a direction parallel to said support means axis, said means including a continuous, unending cam surface fixed to one of said support means and said carrier means and a cam follower fixed to the other of said support means and said carrier means.

2. The apparatus as set forth in claim 1 further including means for maintaining said cam follower in engagement with said cam surface, said maintaining means being positioned between said support means and said carrier means.

3. The apparatus as set forth in claim 2 wherein said maintaining means is yieldable.

4. The apparatus as set forth in claim 3 wherein said maintaining means is a spring.

5. The apparatus as set forth in claim 3 further including anti-shock means, said anti-shock means including a continuous, unending surface positioned in opposing relation to said cam surface and spaced from said cam surface a distance which limits the relative movement between said carrier means and said support means in a direction parallel to said axis at any given relative angular position between said support means and said carrier means.

6. A multiple objective suporting and positioning assembly for a microscope, said assembly comprising:
   a. support means having an axis, said support means including guide means;
   b. carrier means having an axis, said carrier means including a plurality of objective mounting means and guide means, said carrier guide means cooperating with said support guide means to substantially align said axes and permit both relative rotational movement between said support means and said carrier means about said coincident axes and relative movement between said support means and said carrier means in a direction parallel to said coincident axes; and
   c. means fixed to both said support means and said carrier means for inducing movement of said carrier means relative to said support means in a direction parallel to said coincident axes in response to rotational movement of said carrier means relative to said support means, said means including a continuous, unending cam surface provided on one of said support means and said carrier means and a cam follower provided on the other of said support means and said carrier means.

7. The apparatus as set forth in claim 6 wherein said guide means are cooperating cylindrical surfaces.

8. The apparatus as set forth in claim 6 wherein each of said objective mounting means has an axis, said axes being substantially parallel to each other, said objective mounting means axes being substantially parallel to said support means axis and substantially equally spaced from said support means axis.

9. The apparatus as set forth in claim 8 wherein the objective mounting means for receiving the highest power objective includes a stop means for positioning said highest power objective therein and wherein the objective mounting means for receiving the lower power objectives are provided with a means for receiving a tool for adjusting the position of said lower power objectives relative to said highest power objective to achieve parfocality.

10. The apparatus as set forth in claim 6 further including bias means, said bias means being supported between said support means and said carrier means to yieldably urge said cam follower into engagement with said cam surface.

11. The apparatus as set forth in claim 10 further including anti-shock means, said anti-shock means including a continuous, unending surface positioned in opposing relation to said cam surface and spaced from said cam surface a distance which limits the relative movement of said carrier means relative to said support means in a direction parallel to said coincident axes at any given relative angular position between said support means and said carrier means.

12. A cam actuated assembly for a microscope, said microscope having an optical axis, said assembly comprising:
   a. support means including a hollow tubular member having an internal surface that is symmetrical about an axis which, when said support means is assembled in said microscope, is offset from and substantially parallel to said optical axis, said tubular member including a continuous, unending cam surface;
   b. carrier means having an axis of rotation and including an exterior surface, a cam follower and a plurality of objective mounting means, said exterior surface being symmetrical about said carrier axis, each of said objective mounting means having an axis substantially parallel with said carrier axis, said carrier being rotatably received within said hollow tubular member such that said carrier axis substantially coincides with said axis of said tubular member and said cam follower engages said cam surface, whereby said carrier means may be rotated relative to said support means to successively align said axes of said objective mounting means with said optical axis and to simultaneously move said carrier relative to said support means in a direction substantially parallel to said axis of said tubular member;
   c. spring means, said spring means being supported between said support means and said carrier means for biasing said cam follower into engagement with said cam surface; and
   d. anti-shock means, said anti-shock means including a continuous unending stop surface, said anti-shock means being located relative to said support means such that said stop surface is in opposing relation to said cam surface and spaced from said cam surface a distance which limits the movement of said carrier means relative to said support means in a direction parallel to said coincident axes at any given relative angular position between said support means and said carrier means.

* * * * *

UNITED STATES PATENT OFFICE
CERTIFICATE OF CORRECTION

PATENT NO. : 3,963,306
DATED : June 15, 1976
INVENTOR(S) : Guy E. Martin

It is certified that error appears in the above-identified patent and that said Letters Patent are hereby corrected as shown below:

Column 1: line 36, after "follower," insert --is--; and
line 38, change "movements" to --movement--.

Signed and Sealed this

Seventh Day of September 1976

[SEAL]

Attest:

RUTH C. MASON
*Attesting Officer*

C. MARSHALL DANN
*Commissioner of Patents and Trademarks*